United States Patent [19]

Pecora

[11] Patent Number: 4,942,757

[45] Date of Patent: Jul. 24, 1990

[54] HYDRAULIC PRESS WITH INFINITE HEAD ROTATION

[75] Inventor: Gennaro L. Pecora, Manchester, N.H.

[73] Assignee: Burndy Corporation, Norwalk, Conn.

[21] Appl. No.: 332,341

[22] Filed: Mar. 31, 1989

[51] Int. Cl.[5] .......................... B21J 9/12; B23P 11/00

[52] U.S. Cl. .................................... 72/453.16; 72/416

[58] Field of Search ........... 72/453.16, 453.15, 453.18, 72/453.01, 446, 407, 416

[56] References Cited

U.S. PATENT DOCUMENTS 2,696,850 12/1954 Peterson ........................... 72/453.16
2,821,877 2/1958 Swanson .......................... 72/453.16
4,589,272 5/1986 Hutson ............................. 72/453.16

FOREIGN PATENT DOCUMENTS 4584 of 1927 Australia .............................. 72/416

*Primary Examiner*—Daniel C. Crane
*Attorney, Agent, or Firm*—Burtsell J. Kearns; Patrick J. Walsh

[57] ABSTRACT

A hydraulic tool for crimping connectors to electrical power lines includes a C-shaped crimping head which is infinitely rotatable with respect to the main body of the hydraulic tool for ease of positioning the tool with respect to workpieces. The invention particularly relates to the means for having a C-shaped head on the tool to achieve universal rotation while maintaining integrity of the hydraulic system across the rotational interface.

6 Claims, 2 Drawing Sheets

HYDRAULIC PRESS WITH INFINITE HEAD ROTATION

BACKGROUND OF THE INVENTION

The present invention relates to crimping tools particularly to hydraulic crimping tools for affixing electrical connectors to wire transmission lines.

Hydraulic tools of this kind have been used for a number of years, as for example, Burndy Corporation HYPRESS Models Y35 and Y35-2. These tools include hydraulically driven dies for criaping electrical connectors onto transmission lines or for splicing transmission lines.

An hydraulic tool of this kind includes a head member containing the crimping dies which can be rotated 180° relative to the operating handles for ease of positioning the crimping dies over a workpiece. The hydraulic tool is operated by placing the dies in position over an electrical connector, rotating a reservoir handle to advance a movable die into position on a connector and then pumping the operating handle to develop sufficient hydraulic force enabling the dies to crimp the connector. Approximately twelve tons of force are developed at the die head during a crimping operation. After crimping is complete, the tool is disengaged by releasing the hydraulic pressure, and retracting the dies.

In hydraulic tools of this kind it is desirable to provide for rotation of the die head with respect to the operating handles in order to improve utility of the tool particularly enabling the operator to position the crimping dies over connectors while maintaining a safe and convenient posture for operating the tool. A rotatable die head enables the operator safely and conveniently to engage and crimp connectors which are difficult to reach.

The Burndy Y35/Y35-2 HYPRESS models have rotatable die heads, however, the rotation is limited to 180° relative to the operating handle.

Rotatable heads for hydraulic press tools are revealed in prior patents of which Swanson U. S. Pat. No. 2,821,877 is illustrative. In Swanson the die head is fully rotatable with respect to the hydraulic tool handle. The upper die is affixed to a C-shaped die head and the lower die is attached to a piston ram located within a cylinder formerly in the upper body portion of the tool. The die head and the piston ram are interlocking by a bolt member so that upper and lower dies are fully rotatable while the dies maintain working alignment. The design disclosed in Swanson involves rotation of the piston ram within a stationary cylinder and results in conflicting design requirements, viz., a fluid tight hydraulic power system and ease of rotation of piston ram. Swanson utilizes a set of ball bearings for rotating the die head on the stationary upper body of the tool. The bearings and their retaining grooves must also withstand the full crimping force developed between the die head and the tool during crimping operations. Additionally, in rotating the piston ram must prevent rotational stress from occurring in an internally mounted ram return spring. Swanson does this by means of a ball detent engaging the end of a spring retaining bolt. While the ball dent accommodates piston ram rotation, it is also called upon to prevent axial movement of the spring retaining bolt against the large axially directed clamming force developed by the power tool.

The result is a complex design in Swanson where many parts are called upon to serve several conflicting functional requirements.

SUMMARY OF THE INVENTION

The present invention is directed to an hydraulic power tool in which the die head is infinitely rotatable with respect to operating handles and the hydraulic power system so that an operator can position the head for engaging a workpiece in a convenient manner.

According to the present invention, there is provided a new and improved hydraulic crimping tool particularly in respect to the mounting arrangement by which rotation of the die head is achieved.

According to the invention, the die head is infinitely rotatable with respect to the fixed handle of the pump housing so that the die head may be rotated an indeterminate number of revolutions without limit or without having to reset or reposition the die head and without stressing die head component parts. This arrangement is provided and facilitated by a new and useful interconnection between the cylinder and the pump housing and by unique fluid flow channels from the pump housing through the pump/die head interface.

OBJECTS OF THE INVENTION

It is an object of the invention to provide a new and improved hydraulic crimping tool with an infinitely rotatable crimping head.

Another object of the invention is to provide a hydraulic crimping tool with an infinitely rotatable head in which the fluid flow from power piston to cylinder is conducted axially of the rotatable interface between C-shaped head and pump housing.

Other and further objects of the invention will occur to one upon employment of the invention in practice or on an understanding of the attached detailed description of the invention.

DETAILED DESCRIPTION OF PREFERRED EMBODIMENT

Figure 1:
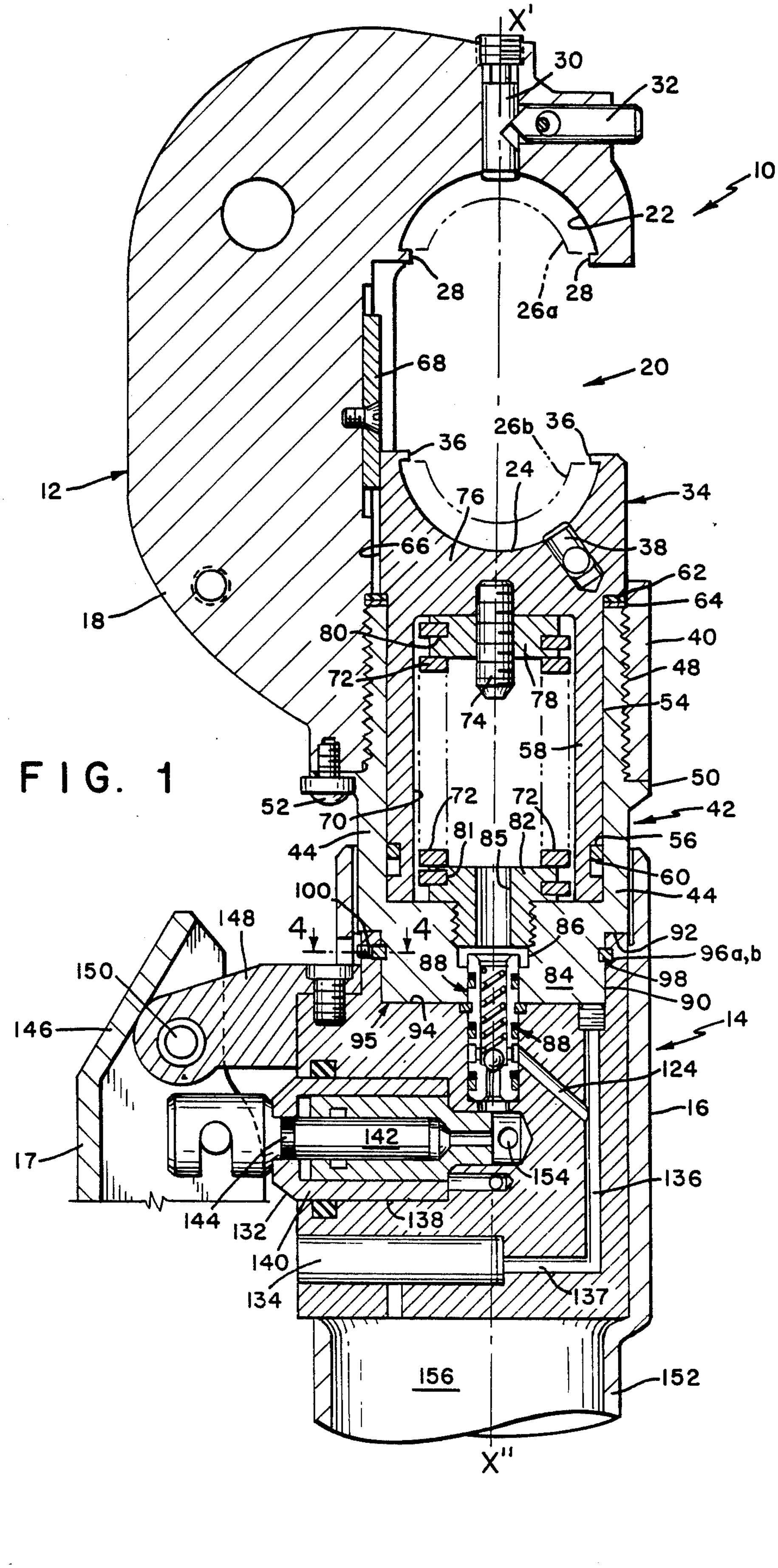
FIG. 1 is an elevational view partly in section, of a hydraulic crimping tool according to the present invention.

Referring now to the drawing and particularly to FIG. 1, the hydraulic crimping tool 10 according to the present invention comprises several major components including a rotatable C-shaped die head 12, a pump housing 14, and operating handles 16 and 17.

The die head assembly includes a unitary C shaped head 18, preferably cast integral, defining a die cavity 20 between a fixed upper jaw 22 and a movable lower jaw 24. The upper jaw is in the form of a cresent and receives a U-shaped die **26*a* supported by spaced ridges 28 and retained by a pin 30 and cooperating release shaft 32. The die slips transversely into position in the upper jaw crescent. The lower jaw 24 is also in the form of a crescent at the upper surface of a piston ram 34 receiving a lower U shaped die 26*b* (preferably identical to the upper die) between spaced supporting ridges 36 and being retained by a lock pin 38**. As more fully described below, the upper and lower dies engage a connector workpiece (not shown) crimping it into place with substantial crimping force developed by operating the tool.

The die head 18 includes an integral tubular hub 40 for receiving a cylinder and piston subassembly 42. The cylinder 44 opens upwardly toward the die cavity for receiving the piston ram 34 in telescoping relation. The cylinder body 44 is threaded at 48 along its upper surface above a circumferential ridge 50 for assembly and retention within tubular hub 40. A suitable fastener 52 secures die head 18 and cylinder body 44 against relative rotation when assembled.

The piston ram 34 is slidably received within the cylinder bore 54 and is recessed at 56 along its skirt 58 to receive piston rings 60. A piston washer 62 and a wiper 64 are positioned at the cylinder open end. A longitudinal groove 66 extends along the side of piston head for engagement with a guiding key 68 attached to the die head 18 so that the piston maintains axial alignment as it emerges from the cylinder during operation.

The under side of the piston ram 34 is downwardly open defining an interior cavity 70 for receiving a ram retracting coil spring 72. An axial retaining pin 74 is fastened to the under side of the piston head 76 and receives an upper spring retaining collar 78. The collar is threaded onto the retaining pin and the upper end of the coil spring is threaded onto a corresponding spiral groove 80 in the side face of the collar. The lower end of the coil spring is similarly retained in spiral groove 81 of lower collar 82 affixed to the cylinder base 84. The lower collar includes a port 85 for admitting hydraulic fluid to the piston interior. In operation, the coil spring 72 expands as the piston ram advances from the cylinder into the die cavity and retracts the ram when operating hydraulic pressure is released.

Figure 2:
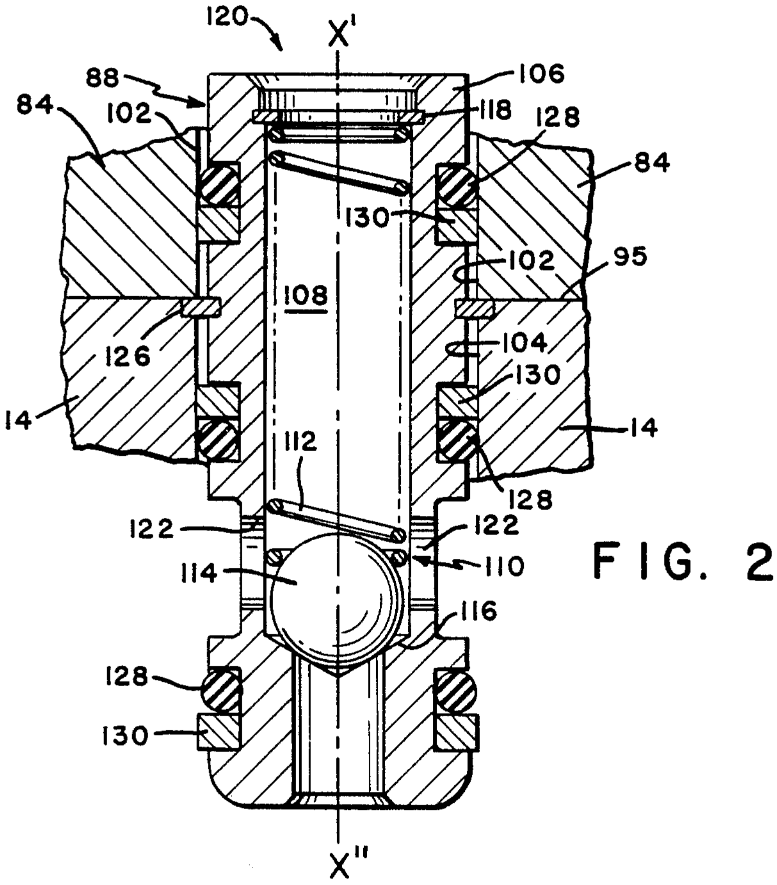
FIG. 2 is an enlarged section view of an interface port assembly embodied in the tool of FIG. 1.

The base of the cylinder body includes a central orifice 86 accommodating an interface port 88 (FIG. 2) and a bottom interface surface 90 necked below a circumferential shoulder 92 for engagement with the pump housing 14. The cylinder interface surface 90 and the complementary pump housing upper surface 94 define a rotational interface 95 between die head assembly and remainder of the hydraulic tool. The cylinder base and the pump housing contain confronting coplanar grooves **96*a* and 96*b* on opposite sides of the rotational interface 95 (FIG. 4m for receiving a retaining or locking collar 98 held in place by means of a set screw 100. The grooves extend the entire circumference of cylinder base and pump housing. The retaining collar and grooves preferably have rectangular cross-sections. The collar 98 is fabricated of robust spring steel of sufficient mechanical strength to retain the die head and piston/cylinder subassembly in fixed axial position with respect to the pump housing without deforming under the substantial hydraulic operating force developed as the dies are crimping a connector workpiece. Additionally, the retaining collar interconnects cylinder base and pump housing allowing infinite rotation clockwise and counter-clockwise of die head on the hydraulic tool at the die head/pump housing interface 95: The collar occupies confronting groves 96*a*, 96*b* through substantially their entire circumference. One end of the collar includes a loop 97 for gripping the collar as it is inserted into the grooves during tool assembly through an opening 99 in the pump housing. Set screw 100** holds the collar in position in final assembly of the tool. In order to remove the die head from the tool for maintenance, inspection, and so forth, set screw is removed and the collar is removed from its grooves through access opening. The die head subassembly can now be removed from the tool.

Figure 3:
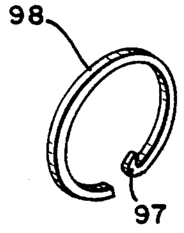
FIG. 3 is a perspective view of a retaining collar embodied in the tool of FIG. 1.

The interface port assembly 88 is illustrated in FIGS. 1 and 3. The interface port establishes a fluid tight passage for hydraulic power fluid across the rotational interface 95. The interface port is fitted into aligned orifices 102, 104 in the cylinder base and in the pump housing defining a fluid channel between hydraulic power pump and the under side of piston ram. The interface port lies along the longitudinal axis X′—X″ of the tool which is the axis of rotation of die head with respect to the reservoir handle 16. The interface port communicates the power pump outlet to the piston ram across the rotational interface without admitting pressurized fluid to the interface. The interface port includes a tubular port body 106 with an internal duct 108 defining a flow channel for hydraulic fluid from pump housing to the piston ram. The flow channel is provided with a ball-check valve 110 including a spring llZ urging valve ball 114 against a valve seat 116 formed in the side wall of the channel. A retaining ring 118 holds the spring in position at the outlet end 120 of the port body. The interface port is fitted into a recess in the pump housing with ports 122 aligned with a channel 124 (FIG. 1). A retaining ring 126 secures the interface port against axial movement across the interface. The outer surface of the interface port is provided three sets of 0-rings 128 and back-up rings 130 to assure fluid tightness of the interface port. With this axial alignment of the interface port, the die head can be rotated to any desired position while fluid communication from power pump to piston ram remains unaffected.

The power housing 14 also includes an hydraulic pump 132, a pressure relief valve 134, and suitable internal ducting 136 for directing hydraulic fluid during operation of the tool.

The pump includes a cylinder 138 and large 140 and small 142 pistons connected to a piston rod 144 reciprocated by operating handle 146 pivotally attached to the main body by suitable connecting arms 148 and pivot shaft 150. The outer piston when operated pressurizes the hydraulic fluid in the reservoir handle 152 through pump housing ducts (not shown) interconnecting pressure chamber 154, the reservoir 156, and the main cylinder head 86. The pressure so developed by large piston 140 primes the main cylinder head with low pressure hydraulic fluid to advance the piston ram and lower die into engagement with the connector workpiece against the force of retracting spring 72. Continued reciprocation of the operating handle develops the high operational hydraulic fluid crimping pressure by means of small piston 142. The pressure so developed urges the dies with full force completing the crimping operation.

The interface port 122 bleeds high pressure hydraulic fluid through relief channels 124, 136 and 137 to a pressure relief valve 134. The pressure relief valve 134 releases pressurized fluid through internal pump housing channels (not shown) to reservoir 156 when full operating pressure is achieved Expansion spring 72 will then retract the lower die from a connector workpiece.

In operation, the hydraulic press die head is rotated manually to a convenient position for the operator to engage a connector workpiece. By reciprocating the operating handle, the piston ram advances moving the dies into engagement with a connector workpiece. The operator actuates the power pump by continuing the reciprocation of the pump handle thereby delivering pressurized hydraulic fluid from the pump through the interface port to the piston ram. As fluid pressure develops the dies crimp the workpiece connector into place. Thereafter, the fluid pressure is relieved by the pressure relief valve either hydraulically or mechanically returning pressurized fluid through relief valve ducts into the reservoir.

It will be thus seen that the present invention represents a substantial improvement in the utility of hydraulic crimping tools with infinitely rotatable die heads.

I claim:

1. An hydraulic crimping tool comprising a die head subassembly, a pump housing, and operating handles, the die head having an upper jaw for receiving and retaining a first crimping die, a hub affixed to the die head, and a piston and cylinder assembly received by the hub and secured thereto against relative rotation, the piston fitted into the cylinder and having a ram head for receiving a second crimping die cooperating with the upper jaw die for crimping workpieces, the piston having an interior cavity for receiving pressurized fluid for advancing the piston ram during crimping operation, the cylinder having an open bottom wall for directing hydraulic fluid to the piston cavity, the pump housing having an upper surface for receiving the cylinder bottom wall defining a rotational interface between die head and pump housing, an interface port extending through the pump housing across the rotational interface into the cylinder bottom wall opening, the die head and pump housing being mounted for rotation with respect to each other, and means for securing the die head and pump housing against axial movement with respect to each other while accommodating rotation of the head with respect to the pump housing.

2. A crimping tool as defined in claim 1 in which the piston and cylinder and the interface port are aligned along the axis of rotation of the die head.

3. A crimping tool as defined in claim 2 which further includes a pressure relief valve, and in which the interface port includes a channel member along the axis of rotation, a retaining ring at the rotational interface securing the channel member against movement along said axis, one way valve means within the channel for admitting pressurized fluid to the under side of the piston, means for sealing the channel member across the rotational interface, and means for communicating pressurized fluid between the channel member and the relief valve.

4. An hydraulic crimping tool comprising a die head subassembly, a pump housing, and operating handles, one of the operating handles being pivotally mounted to the tool for pressurizing fluid within the pump housing for operating the tool, the die head having an upper jaw for receiving and retaining a first crimping die, a hub affixed to the die head, and a piston and cylinder assembly received by the hub and secured thereto against relative rotation, the piston fitted into the cylinder and having a ram head for receiving a second crimping die cooperating with the upper jaw die for crimping workpieces, the piston having an interior cavity for receiving pressurized fluid for advancing the piston ram during crimping operation, the cylinder having an open bottom wall for directing hydraulic fluid to the piston cavity, the pump housing having an upper surface for receiving the cylinder bottom wall defining a rotational interface between die head and pump housing, an interface port extending through the pump housing across the rotational interface into the cylinder bottom wall opening, the piston and cylinder and the interface port being aligned along the axis of rotation of the die head, the die head and pump housing being mounted for rotation with respect to each other, means for securing the die head and pump housing against axial movement with respect to each other while accommodating rotation of the die head with respect to the pump housing, the securing means including confronting coplanar grooves in the cylinder bottom wall and the pump housing rotational interface with the grooves being centered along the axis of rotation, and a collar in the grooves.

5. An hydraulic crimping tool comprising a die head subassembly, a pump housing, and operating handles, one of the operating handles being pivotally mounted to the tool for pressurizing fluid within the pump housing for operating the tool, the die head having an upper jaw for receiving and retaining a first crimping die, a hub affixed to the die head, and a piston and cylinder assembly received by the hub and secured thereto against relative rotation, the piston fitted into the cylinder and having a ram head for receiving a second crimping die cooperating with the upper jaw die for crimping workpieces, the piston having an interior cavity for receiving pressurized fluid for advancing the piston ram during crimping operation, the cylinder having an open bottom wall for directing hydraulic fluid to the piston cavity, the pump housing having an upper surface for receiving the cylinder bottom wall defining an interface for relative rotation of die head and pump housing with respect to a common axis, an interface port extending through the pump housing across the interface into the cylinder bottom wall opening, means for securing the die head and pump housing against axial movement with respect to each other while accommodating rotation of the head with respect to the pump housing, a pressure relief valve, the interface port including a channel member along the common axis, a retaining ring at the rotational interface securing the channel member against movement along said axis, valve means within the channel for admitting pressurized fluid to the underside of the piston, means for sealing the channel member across the rotational interface, a pressure relief valve, and means for communicating pressurized fluid between the channel member and the relief valve.

6. An hydraulic crimping tool comprising a die head subassembly, a pump housing, and operating handles, one of the operating handles being pivotally mounted to the tool for pressurizing fluid within the pump housing for operating the tool, the die head having an upper jaw for receiving and retaining a first crimping die, a hub affixed to the die head, and a piston and cylinder assembly received by the hub and secured thereto against relative rotation, the piston fitted into the cylinder and having a ram head for receiving a second crimping die cooperating with the upper jaw die for crimping workpieces, the piston having an interior cavity for receiving pressurized fluid for advancing the piston ram during crimping operation, the cylinder having an open bottom wall for directing hydraulic fluid to the piston cavity, the pump housing having an upper surface for receiving the cylinder bottom wall defining an interface for relative rotation of die head and pump housing with respect to a common axis, an interface port extending through the pump housing across the interface into the cylinder bottom wall opening the interface port including a channel member along the common axis of rotation, means at the rotational interface securing the channel member against movement along said axis, means within the channel for admitting pressurized fluid to the underside of the piston, means for sealing the channel member across the rotational interface, a pressure relief valve, and means for communicating pressurized fluid between the channel member and the relief valve.

* * * * *